United States Patent Office 3,592,850
Patented July 13, 1971

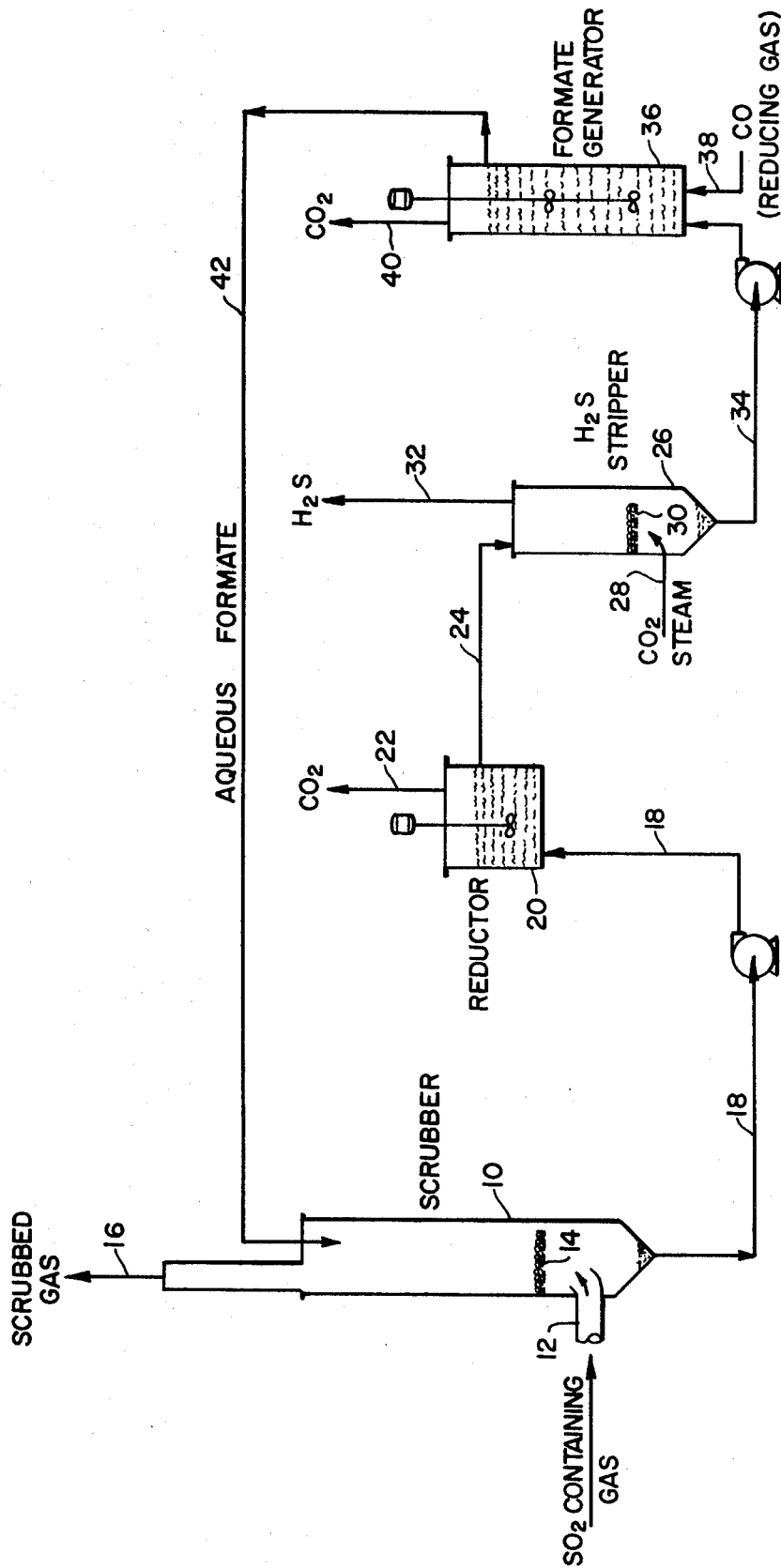

3,592,850
REGENERATION OF FORMATE FROM THIOSULFATE
Nestor J. Mazzocco and Everett Gorin, Pittsburgh, and Paul M. Yavorsky, Monongahela, Pa., assignors to Consolidation Coal Company, Pittsburgh, Pa.
Continuation-in-part of application Ser. No. 879,225, Nov. 24, 1969. This application June 17, 1970, Ser. No. 47,040
Int. Cl. C07c 53/06
U.S. Cl. 260—542
5 Claims

ABSTRACT OF THE DISCLOSURE

Alkali metal formate is made from alkali metal thiosulfate by the following three steps:

(1) Reduction:
$$4MCOOH + M_2S_2O_3 + H_2O = 4MHCO_3 + 2MSH$$
(2) Stripping:
$$MHCO_3 + MSH = M_2CO_3 + H_2S$$
$$CO_2 + H_2O + MSH = MHCO_3 + H_2S$$
(3) Formate synthesis:
$$M_2CO_3 + 2CO + H_2O = 2MCOOH + CO_2$$
$$M_2CO_3 + CO + H_2 = 2MCOOH$$

where M is either sodium or potassium. The foregoing process is useful in connection with the absorption of sulfur dioxide from flue gas by alkali metal formate at temperatures above 140° F. to form the corresponding thiosulfate.

CROSS-REFERENCES TO RELATED APPLICATIONS

This is a continuation-in-part of application, Ser. No. 879,225, filed Nov. 24, 1969, now abandoned. Other related applications describing and claiming certain subject matter hereinafter disclosed in connection with the invention of the present application are an application, Ser. No. 879,223, filed Nov. 24, 1969 by E. Gorin and P. M. Yavorsky entitled "Desulfurization of Flue Gas" and an application, Ser. No. 879,224, filed Nov. 24, 1969 by P. M. Yavorsky and E. Gorin entitled "Conversion of Thiosulfate to Formate."

BACKGROUND OF THE INVENTION (1) Field of the invention

The present invention generally relates to the removal of sulfur dioxide from gases by reaction with either potassium or sodium formate and, more particularly, to the regeneration of the formate that is consumed in the reaction.

(2) Description of the prior art

In the copending application, Ser. No. 879,223 filed by E. Gorin and P. M. Yavorsky entitled "Desulfurization of Flue Gas" referred to above, there is described a process for removing sulfur dioxide from hot flue gas which comprises reacting the sulfur dioxide with potassium or sodium formate in an aqueous state. The principal product of the reaction is the corresponding thiosulfate, as shown by the following equation:

(1) $\quad 2MCOOH + 2SO_2 = M_2S_2O_3 + 2CO_2 + H_2O$ where M is either Na or K.

The thiosulfate is useful per se, for example as fixing agent in developing solutions used in photography. However, it is generally preferred to regenerate formate from the thiosulfate for reuse in the absorption of sulfur dioxide.

SUMMARY OF THE INVENTION

In accordance with the present invention, a process is provided for converting aqueous potassium or sodium thiosulfate to the corresponding aqueous formate, which may then be used in the absorption of sulfur dioxide from flue gas. The process of the present invention comprises three steps wherein the first step is the conversion of the aqueous thiosulfate to the corresponding bicarbonate and bisulfide by reaction with the corresponding formate; the second step is the conversion of the bicarbonate and bisulfide to the corresponding carbonate and hydrogen sulfide, the latter being stripped from the reaction mixture; and the third step is the synthesis of the desired formate by reaction of the carbonate with carbon monoxide and water or hydrogen.

The principal reactions involved in the three successive steps may be expressed by the following equations:

Step 1 (reduction)
(2) $\quad 4MCOOH + M_2S_2O_3 + H_2O = 4MHCO_3 + 2MSH$

Step 2 (stripping)
(3) $\quad\quad MHCO_3 + MSH = M_2CO_3 + H_2S$
(4) $\quad\quad CO_2 + H_2O + MSH = MHCO_3 + H_2S$ Step 3 (formate synthesis)
(5) $\quad M_2CO_3 + 2CO + H_2O = 2MCOOH + O_2$
(6) $\quad\quad M_2CO_3 + CO + H_2 = 2MCOOH$ Reaction (2) of Step 1 proceeds rapidly at temperatures above 475° F. The temperature is preferably between 500° and 600° F. The pressure is maintained between 200 and 3000 p.s.i.g., preferably above 500 p.s.i.g.

Reactions (3) and (4) in Step 2 proceed readily at temperatures between 200 and 300° F., preferably 230 to 270° F. The pressure is preferably, but not necessarily, above atmospheric. Instead of stripping with $CO_2$, as indicated by reaction (4), an inert gas may be used. In that case, more bicarbonate may have to be added in order to complete the conversion of the bisulfide to $H_2S$ as set forth in reaction (3).

Reactions (5) and (6) in Step 3 are operated at temperatures between 450 and 750° F., but preferably between 480 and 570° F. at pressures between 200 and 3000 p.s.i.g., but preferably above 500 p.s.i.g.

The conditions and results of runs pertaining to the conversion of potassium thiosulfate to potassium formate in an aqueous system are reported in Tables I, II, and III, below. In this study of regeneration of formate from thiosulfate, the conversion was conducted in three steps, namely, (1) conversion of thiosulfate to sulfides, (2) conversion of sulfides to $H_2S$, and (3) the conversion of the attendant carbonate from (1) and (2) to formate by reaction with CO. Tables I, II, and III relate, respectively, to these three conversion steps.

TABLE I

Continuous Reduction of Aqueous Spent Formate to Provide Sulfur in Sulfide Form

| | For simulated spent formate | For actual spent formate |
|---|---|---|
| Run conditions: | | |
| Temperature, °F | 540 | 540 |
| Pressure, p.s.i.g | 500 | 500 |
| Stirrer speed, r.p.m | 825 | 825 |
| Solution feed rate, gm./hr | 4,140 | 4,370 |
| Reactor inventory, gm | 1,070 | 1,120 |
| Reaction residence time, min | 15 | 15 |
| Feed analysis, wt. percent: | | |
| $K_2S_2O_3$ | 24.0 | 20.23 |
| KCOOH | 56.0 | 52.13 |
| $H_2O$ | 20.0 | 22.06 |
| S as $K_2S_2O_3$ | 8.09 | 6.82 |
| S as $K_2SO_3$ | 0 | 0.19 |
| S as KHS | 0 | 0.32 |
| S as $K_2SO_4$ | 0 | 0.73 |
| Product solution analysis, wt. percent: | | |
| $K_2S_2O_3$ | 1.42 | 0.50 |
| $K_2CO_3$ | 42.01 | 42.43 |
| $KHCO_3$ | 10.68 | 5.04 |
| S as $K_2S_2O_3$ | 0.48 | 0.17 |
| S as $K_2SO_3$ | 0.22 | 0.09 |
| S as KHS | 5.77 | 5.80 |
| S as $K_2SO_4$ | 0.19 | 0 |
| Product gas analysis, vol. percent: | | |
| $H_2S$ | 34.40 | 37.51 |
| $CO_2$ | 64.50 | 61.77 |
| CO | 0.10 | 0.30 |
| $H_2$ | 1.00 | 0.42 |

TABLE II

Stripping $H_2S$ from KHS in Typical Reduced Product Solution by $CO_2$ at 200° F. ($CO_2$ Rate=8 s.c.f./hr. per kgm. of Solution Feed analysis: 15.28% KHS, 36.37% $K_2CO_3$ equivalent,[1] 48.35% $H_2O$ Product analysis: 0.00% KHS, remainder as $K_2CO_3$ and $KHCO_3$

[Off-gas analysis]

| Run time, min. | $H_2S$, vol. percent | $CO_2$ vol. percent |
|---|---|---|
| 5 | 25.19 | 74.81 |
| 10 | 22.11 | 77.89 |
| 20 | 17.94 | 82.06 |
| 40 | 15.14 | 84.86 |
| 60 | 9.96 | 90.04 |
| 90 | 5.00 | 95.00 |
| 120 | 2.01 | 97.99 |
| 150 | 0.00 | 100.00 |

[1] Some carbonate exists as bicarbonate and more so as $CO_2$ is added.

TABLE III

Typical continuous KCOOH regeneration by CO reduction of $K_2CO_3$, using 4 ft. high by 2.63 in. ID stirred reactor Conditions:
    Temperature—536° F.
    Total pressure—1190 p.s.i.g.
    CO partial pressure—700 p.s.i.a.
    $K_2CO_3$ concentration in feed solution—60%
    Feed solution feed rate—2570 gm./hr.
    Feed gas—Pure CO
    CO feed rate—29.5 s.c.f./hr.
    Stirrer speed—1200 r.p.m.
    Reaction residence time—108 min.

Results:
    KCOOH production rate— 1695 gm./hr.
    Synthesis conversion—90.3%
    $CO_2$ in off-gas—35.9%
    CO in off-gas—61.0%
    $H_2$ in off-gas—3.1%

DESCRIPTION OF DRAWING

For a better understanding of our invention, its objects and advantages, reference should be had to the accompanying drawing in which the preferred embodiment of our invention is schematically illustrated.

DESCRIPTION OF PREFERRED EMBODIMENT

Referring to the drawing, numeral 10 designates a flue gas scrubber which is any conventional gas-liquid scrubbing tower for effecting contact of hot flue gas entering the tower through a pipe 12 with the selected aqueous alkali metal formate. The latter circulates downwardly in countercurrent flow relationship to the upflowing flue gas. The aqueous solution of formate is allowed to flow over a bed of beads retained on a perforated grid plate 14 which extends at least partly across the tower 10, thus providing efficient contact of gas and liquid. The temperature within the tower is maintained above 140° F., preferably at or above 200° F., and the pressure at one atmosphere or above, to effect conversion of the aqueous formate to aqueous thiosulfate by reaction with $SO_2$ in accordance with reaction (1). The $SO_2$-free gas is discharged through a stack 16 as clean stack gas. Since the stack gas is at an elevated temperature, the plume does not fall to ground level, but instead, rises and diffuses into the upper atmosphere.

The aqueous solution of unreacted formate and of thiosulfate is withdrawn from tower 10 and pumped through a pipe 18 to a stirred Reductor vessel 20 in which reaction (2) is conducted to effect conversion of thiosulfate to bicarbonate and bisulfide. The residence time required to complete the desired reaction in the Reductor is about twenty minutes. Some $CO_2$ may be formed in the Reductor vessel as a result of the following reaction:

(7) 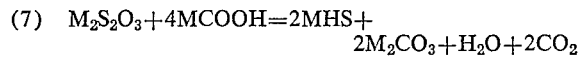
$$M_2S_2O_3 + 4MCOOH = 2MHS + 2M_2CO_3 + H_2O + 2CO_2$$

The $CO_2$ so formed is expelled through a stack 22.

The aqueous solution composed mainly of formate, bicarbonate, some carbonate possibly, and bisulfide is transferred from the Reductor through a pipe 24 to a stripper 26. $CO_2$ and steam are introduced into the stripper through a conduit 28. The conditions of temperature and pressure previously mentioned are maintained to effect reactions (3) and (4) principally, to form carbonate and $H_2S$. The aqueous solution from the Reductor falls downwardly in countercurrent flow relationship to the upflowing $CO_2$ and steam, and through a series of stacked liquid-gas contacting trays to provide maximum contact of gas and liquid. $H_2S$ is removed from the top of the stripper through a pipe 32 to be conducted to a suitable $H_2S$ recovery or conversion unit.

The aqueous solution of principally alkali metal carbonate, some bicarbonate, and unreacted formate is pumped through a conduit 34 to a stirred formate generator 36.

The reactions (5) and (6) of Step 3 are effected in the formate generator under the conditions previously recited. The reducing gas, CO or CO and $H_2$, is introduced into the generator through a conduit 38. The aqueous solution from the stripper is retained in the generator at the reaction conditions for about one hour. $CO_2$ is discharged through a pipe 40. The aqueous formate solution, suitably adjusted to provide a concentration of about 85% formate in water, is recycled through a conduit 42 to the scrubber 10.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:
1. The process of making potassium or sodium formate from the corresponding thiosulfate which comprises
    (a) reducing said thiosulfate to bicarbonate and bisulfide by reaction with potassium or sodium formate at a temperature above 475° F. and a pressure between 200 and 3000 p.s.i.g.;
    (b) maintaining the solution of bicarbonate and bisulfide at a temperature between 200 and 300° F. while passing $CO_2$ therethrough, whereby the sulfur in the bisulfide is converted to $H_2S$ and bicarbonate is converted to carbonate; and

(c) reducing the carbonate to formate by reaction with a reducing gas containing carbon monoxide at a temperature between 450 and 750° F. and a pressure between 200 and 3000 p.s.i.g.

2. The process according to claim 1 wherein the temperature of step (a) is between 500 and 600° F.

3. The process according to claim 2 wherein the temperature of step (b) is between 230 and 270° F.

4. The process according to claim 3 wherein the temperature of step (c) is between 480 and 570° F.

5. The process according to claim 4 wherein the pressure in steps (a), (b), and (c) is above 500 p.s.i.g.

References Cited
UNITED STATES PATENTS
820,374    5/1906    Weise et al. _____ 260—542

JAMES A. PATTEN, Primary Examiner
V. GARNER, Assistant Examiner

U.S. Cl. X.R.
23—63, 64, 115

UNITED STATES PATENT OFFICE
CERTIFICATE OF CORRECTION

Patent No. 3,592,850  Dated July 13, 1971

Inventor(s) N. J. Mazzocco, Everett Gorin & Paul M. Yavorsky

It is certified that error appears in the above-identified patent and that said Letters Patent are hereby corrected as shown below:

Column 2, line 37, Equation (5), reading (5)  $M_2CO_3 + 2\ CO + H_2O = 2\ MCOOH + O_2$ should read:

(5)  $M_2CO_3 + 2\ CO + H_2O = 2\ MCOOH + CO_2$

Signed and sealed this 18th day of January 1972.

(SEAL)
Attest:

EDWARD M. FLETCHER, JR.  ROBERT GOTTSCHALK
Attesting Officer  Acting Commissioner of Patents